C. B. WESTON.
PULLEY BLOCK.
APPLICATION FILED JULY 7, 1916.
1,257,431.
Patented Feb. 26, 1918.
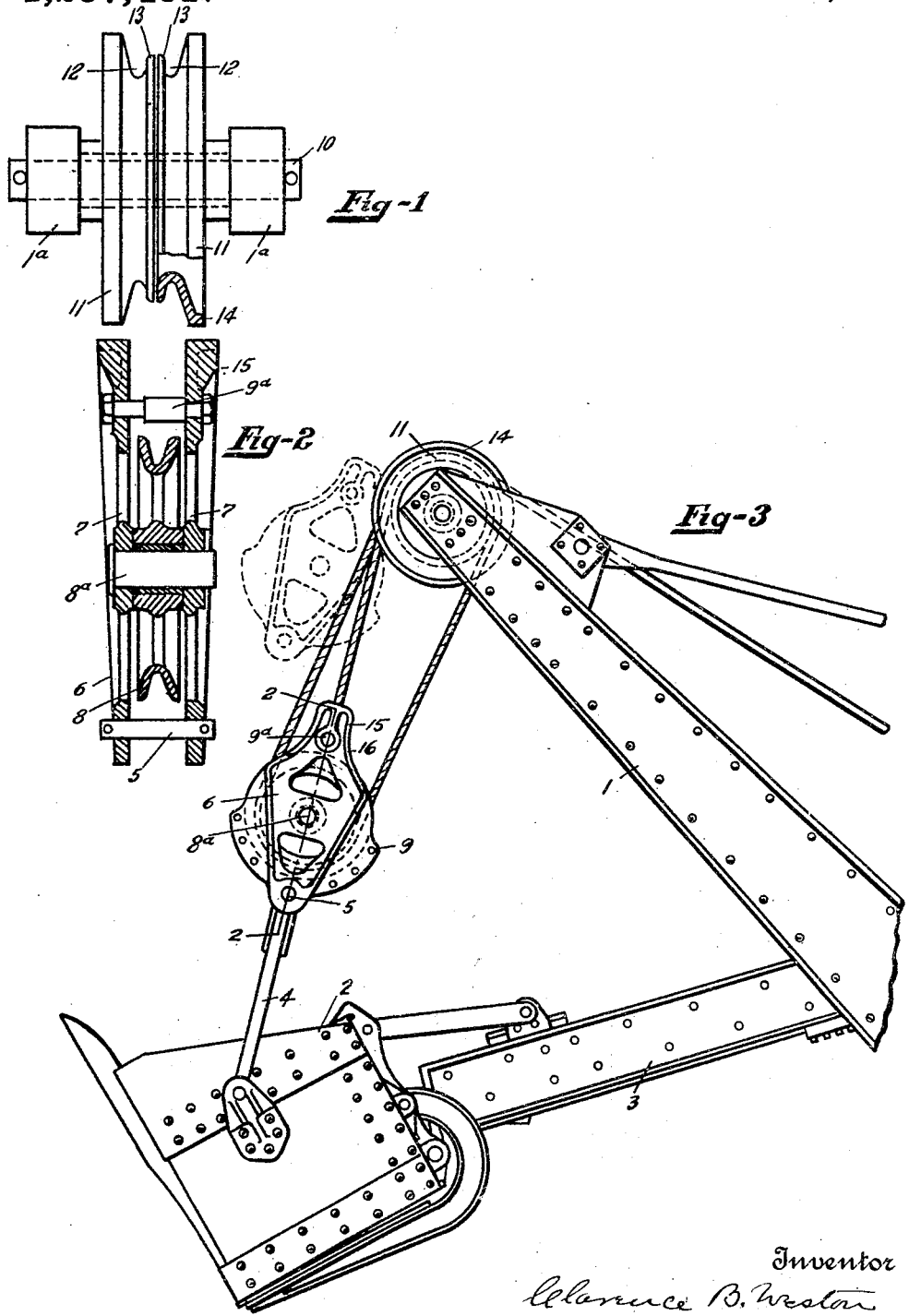
Inventor
Clarence B. Weston
By
Attorney

UNITED STATES PATENT OFFICE.

CLARENCE B. WESTON, OF ERIE, PENNSYLVANIA, ASSIGNOR TO BALL ENGINE COMPANY, OF ERIE, PENNSYLVANIA, A CORPORATION OF PENNSYLVANIA.

PULLEY-BLOCK.

1,257,431.  Specification of Letters Patent.  Patented Feb. 26, 1918.

Continuation of application Serial No. 3,358, filed January 20, 1915. This application filed July 7, 1916. Serial No. 107,919.

*To all whom it may concern:*

Be it known that I, CLARENCE B. WESTON, a citizen of the United States, residing at Erie, in the county of Erie and State of Pennsylvania, have invented new and useful Improvements in Pulley-Blocks, of which the following is a specification.

This invention relates to pulley blocks and consists in certain improvements in the construction thereof as will be hereinafter fully described and pointed out in the claims.

Pulley blocks used under some conditions, as for instance, at the end of the boom of a steam shovel, are subjected to severe strains and shocks. Ordinarily the cable is run over one pulley on the boom, through the sheave or pulley on the floating block and over a second pulley on the boom. The variation of the cable from alinement in passing over the pulleys on the boom tends to twist the floating block especially when the blocks are drawn close together and this tendency when the blocks are subjected to great weight strains them. Furthermore, when the blocks are drawn chock-a-block, the blocks are subjected to unusual strains. Under these shocks ordinary blocks are broken or bent and the parts are fouled. The object of this invention is to provide a system of pulley blocks tending to obviate these difficulties.

The invention is illustrated in the accompanying drawings as follows:—

Figure 1 shows an end elevation of the pulleys on the boom, one of them being partly in section.

Fig. 2 a section on the line 2—2 in Fig. 3.

Fig. 3 a side elevation of a steam shovel boom and dipper with the pulley block system in place thereon.

1 marks the boom, 2 the dipper, 3 the dipper stick, 4 the bail on the dipper, and 5 a pin for locking the bail with the cheek pieces of the floating block 6. This floating pulley block 6 has a sheave or grooved pulley 8 which is journaled on a pin 8ª extending between the cheek pieces 7. The cheek pieces are secured together by rivets or bolts 9.

The upper pulleys are arranged between the sides 1ª—1ª of the boom 1 and are journaled on a pin 10. The pulleys or sheaves 11 have the grooves 12 between the flanges 13 and 14. The flanges 13 are adjacent to each other and are smaller in diameter than the flanges 14 and are of less thickness. By placing the blocks 11 close together it is possible to make the flanges 13 very slight so that the grooves 12 are brought close together. This is possible because the cable in one groove tends to form a guard holding the cable in the companion sheave. This close association of the two grooves reduces the deviation from alinement of the cable passing through the block 6 and consequently reduces the tendency to twist the block 6.

The enlarged flanges 14 especially when they are extended laterally form buffer surfaces for engaging the block 6 and thus prevent injury to the pulleys. The cheek pieces of the pulley 6 have the buffer surfaces 15 which are adapted to engage the flanges 14 and thus form buffers when the blocks are brought chock-a-block. Preferably the surface 15 as it is extended is curved as at 16 so as to conform to the shape of the flange 14 and thus increase the amount of surface in contact and reduce the tendency to injury. This is clearly shown in dotted lines in Fig. 3.

What I claim as new is:—

1. In a system of pulley blocks, the combination of a pair of grooved pulleys arranged side by side, said grooves being formed by flanges with the flanges on the adjacent sides of the pulleys in close proximity and of less diameter than the outer flanges on the pulleys; an opposed grooved pulley acting in conjunction with said pair of grooved pulleys; and a cable running over one of the pair of grooved pulleys through the opposed pulley and over the second of the pair of grooved pulleys.

2. In a system of pulley blocks, the combination of concentrically grooved pulleys arranged side by side having outer buffer flanges of greater thickness than the central flanges; a floating pulley block adapted to engage the buffer flanges and swing with the pulleys when the pulleys are chock-a-block; and a cable in said blocks.

3. In a system of pulley blocks, the combination of concentrically grooved pulleys arranged side by side having outer buffer flanges of greater diameter than the central flanges; a pulley block adapted to engage the buffer flanges when the pulleys are chock-a-block; and a cable in said blocks.

4. In a system of pulley blocks, the combination of concentricaly grooved pulleys arranged side by side having outer buffer flanges of greater diameter and thickness than the central flanges: a pulley block adapted to engage the buffer flanges when the pulleys are chock-a-block; and a cable in said blocks.

In testimony whereof I have hereunto set my hand.

CLARENCE B. WESTON.

Copies of this patent may be obtained for five cents each, by addressing the "Commissioner of Patents, Washington, D. C."